United States Patent Office 2,773,514
Patented Dec. 11, 1956

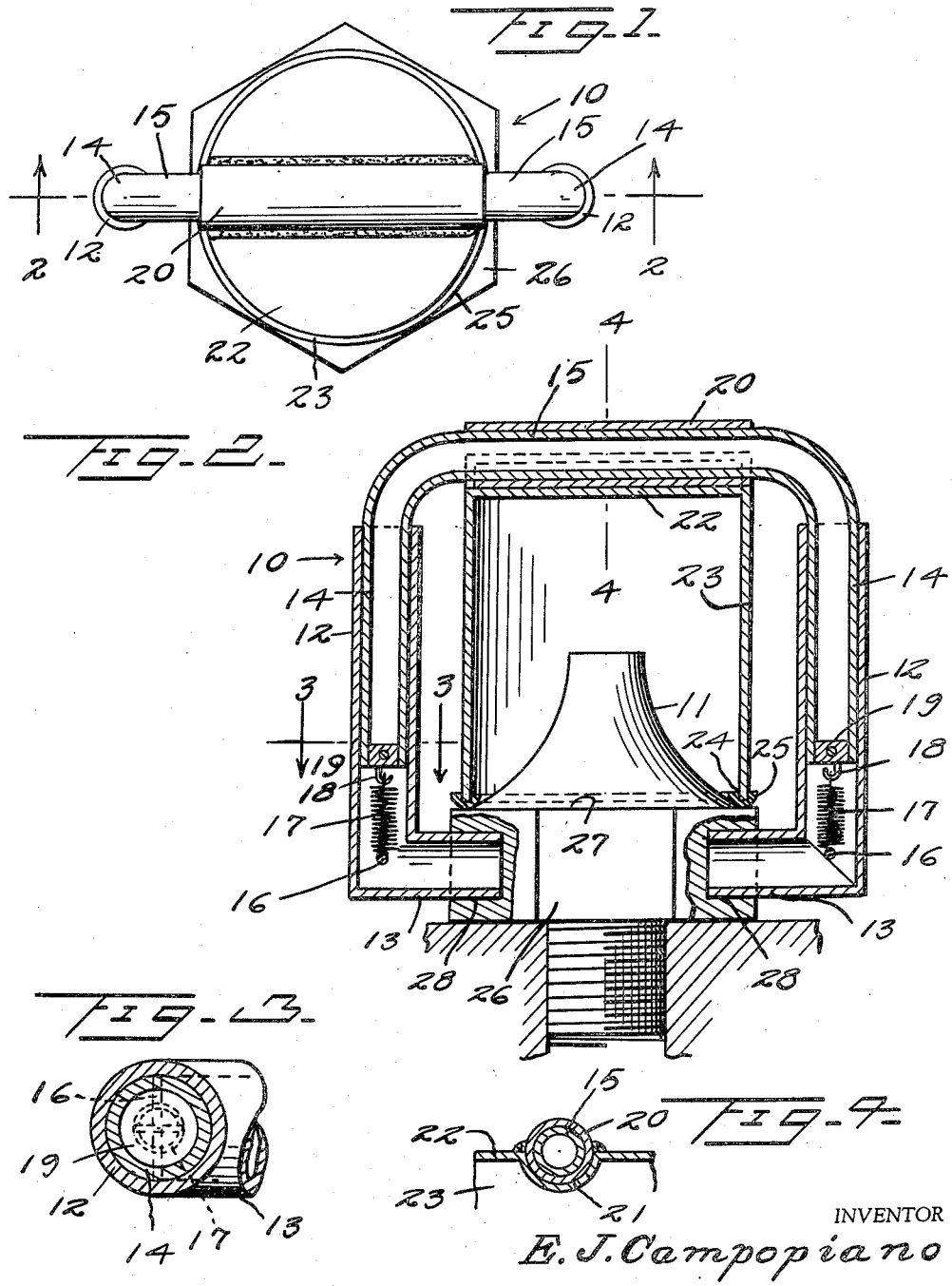

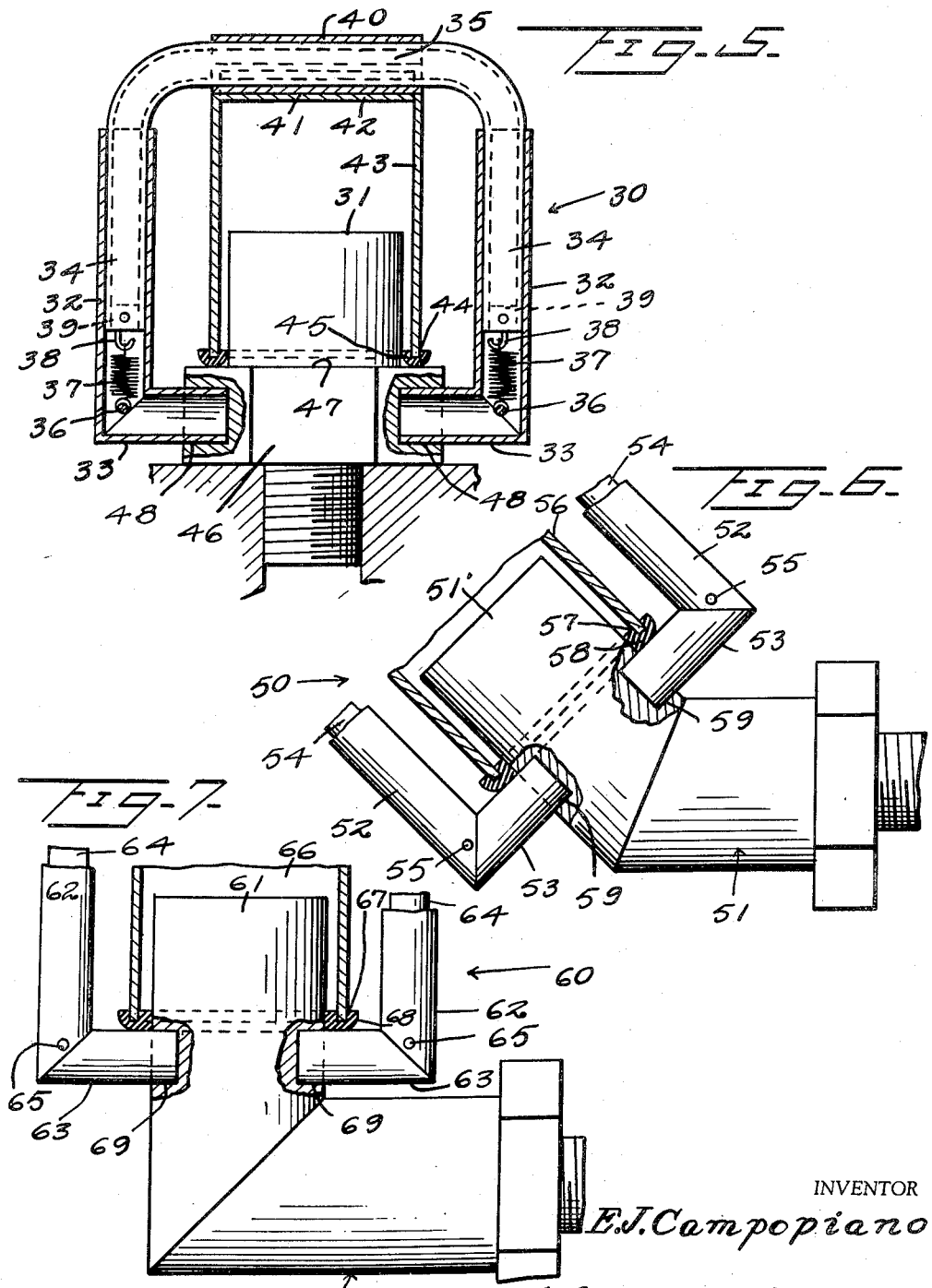

2,773,514

ACCESSORY FOR A GREASE GUN FITTING

Elmer J. Campopiano, Saratoga Springs, N. Y.

Application July 6, 1954, Serial No. 441,299

4 Claims. (Cl. 138—89)

This invention relates to an attachment for a grease gun fitting, and more specifically, to an attachment especially designed for utilization with the grease gun fittings of motor vehicles.

Under present conditions, grease gun fittings for automobiles, trucks, trailers, tractors and other similar and related vehicles are generally exposed to all kinds of inclement weather and road conditions. As a result thereof, dirt, grit, sand, dust and ice tend to accumulate thereover whereby to render the servicing thereof practically impossible. Additionally, and assuming that such fittings were functionally operative, the servicer is frequently careless in wiping away the dirt, mud and other accumulations and as a consequence, when the grease gun is connected to the fitting, the grease under pressure carries this foreign matter to the very point at which it is desired to reduce the friction.

In the past it has been proposed to employ detachable threaded caps and other types of frictionally connected caps but all of these have proved ineffectual inasmuch as they became loosened and subsequently lost, or through the carelessness of the person doing the lubricating operation, the caps were not replaced.

Hence, this invention has, as one of its primary objects, the provision of means for protecting a grease gun fitting against the accumulation of dirt, grime, mud and moisture whereby such accumulation is not injected into the lubricating system.

Another object of this invention is to provide a device of the type described which is pivotally connected with the fitting to prevent accidental loss thereof.

A further object of this invention is to provide a cap for a grease gun fitting which is pivotally connected therewith and which effects an airtight seal with the fitting in order to preclude the entry of moisture or other foreign solid bodies therein for accumulation on the fitting.

Other and further objects and advantages of this invention will become more apparent from a consideration of the following specification when read in conjunction with the annexed drawing, in which:

Figure 1 is a top plan view of an accessory for a grease gun fitting constructed in accordance with this invention.

Figure 2 is a cross-sectional view of the device shown in Figure 1 taken on the horizontal plane of line 2—2 of Figure 1, and looking in the direction of the arrows.

Figure 3 is an enlarged detail cross-sectional view taken on the horizontal plane of line 3—3 of Figure 2, and looking in the direction of the arrows.

Figure 4 is a detail cross-sectional view taken on the vertical plane of line 4—4 of Figure 2, and looking in the direction of the arrows.

Figure 5 is a vertical cross-sectional view, partly in elevation, and illustrating the adaptation of the attachment to a different type of grease gun fitting.

Figure 6 is a fragmentary side elevational view, partly in section, of the accessory of the present invention showing the same as mounted on a third type of grease gun fitting.

Figure 7 is a fragmentary side elevational view of the attachment showing the same as applied to a fourth type of grease gun fitting.

Referring now more specifically to the drawing, reference numeral 10 designates, in general, a moisture, dirt and dust proof cap for "Alemite" and other similar grease gun fittings of which one is illustrated at 11.

The cap 10 comprises a pair of elongated, spaced and substantially parallel tubular members 12 having one of their respective adjacent ends 13 bent laterally at an angle of approximately 90° with respect to the longitudinal axis of their respective tubular members. The ends 13 are disposed in confronting, spaced apart relationship and are coaxially aligned.

An inverted, substantially U-shaped tubular element is provided and comprises a pair of spaced, substantially parallel arms 14 having one of their respective ends telescoped within the other ends of the tubular members 12 while the other ends of the arms 14 are integrally connected by the tubular base 15.

A pin 16 extends transversely across the lower end of each of the tubular members 12 and has anchored thereto one end of a helicoidal spring 17 under tension whose other end is connected with a hook 18 depending from a closure member 19 for each of the telescoped ends of the arms 14. Thus it is seen that the U-shaped element is constantly biased for relative movement toward the arms 14.

An elongated, substantially cylindrical collar 20 is mounted for rotation on the tubular base 15 and is adapted to be received and secured, as by soldering or welding, within a diametrically extending groove 21 formed in the top wall 22 of a cylindrical cap 23. The opposite end, the bottom of the cap, is open and is received within a substantially circular groove 24 of a rubber seal ring 25. Means are provided for adhesively or otherwise securing the ring to the cap.

The fitting 11 is provided with a hexagonal base 26 having an upper surface 27 which is tightly engaged by the lower end of the seal ring 25. A pair of opposite sides of the base 26 are each formed with coaxially aligned inwardly extending cylindrical recesses 28 which are designed to pivotally support and receive the laterally bent ends 13 of the tubular members 12.

In operation, and assuming the several component elements of the above described device are in their respective relative positions as illustrated in Figure 1, the operator grasps the cylindrical cap 23 and pulls it in a direction away from the fitting 11. After the cap 23 has been moved a distance sufficient to clear the outer end of the fitting 11 (as shown in dotted lines in Figure 2) the device 10 is rotated in either direction about the horizontal axis of the ends 13 of the tubular members 12, and is then released. The fitting is then connected with a grease gun (not shown) and supplied with grease under pressure. After this operation, the cap 23 is again grasped and pulled outwardly relative to the base 26, and the device is then pivoted in the opposite direction until the open end thereof is substantially concentric with the base 26. At that time the cap 23 is released for movement toward the base 26 under the influence of the spring 17.

Reference is now made specifically to Figure 5 of the drawings in which the instant attachment is shown as applied to a second type of grease gun fitting. Reference numeral 30 designates, in general, a dust proof cap constructed in accordance with this invention and comprises, as before, a pair of elongated, spaced and substantially parallel tubular members 32 having one of their respective adjacent ends 33 bent laterally at an angle of approximately 90° with respect to the longitudinal axis of their respective tubular members. The ends 33 are disposed in confronting, spaced apart relationship and are coaxially aligned.

An inverted substantially U-shaped tubular element is provided and comprises a pair of spaced, substantially parallel arms 34 having one of their respective ends telescoped within the other ends of the tubular members 32, while the other ends of the arms 34 are integrally connected by the tubular base 35.

A pin 36 extends transversely across the lower end of each of the tubular members 32 and has anchored thereto one end of a helicoidal spring 37, under tension, whose other end is connected with a hook 38 depending from a closure member 39 for each of the telescoped ends of the arms 34. It is thus seen that the U-shaped element is constantly biased for relative movement toward the arms 34.

An elongated, substantially cylindrical collar 40 is mounted for rotation on the tubular base 35 and is adapted to be received and secured, as by soldering or welding, within a diametrically extending groove 41 formed in the top wall 42 of a cylindrical cap 43. The opposite end, the bottom of the cap 43, is open and is received within a substantially circular groove 44 of a rubber seal ring 45. Means are provided for adhesively or otherwise securing the ring to the cap.

The fitting 31 is provided with a hexagonal base 46 having an upper surface 47 which is tightly engaged by the lower end of the seal ring 45. It should also be noticed at this point that the seal ring 45 is in sliding engagement with the cylindrical surface of the fitting 31 whereby a double seal effect is achieved through the use of this attachment in connection with grease gun fittings of the type illustrated in Figure 5.

A pair of opposite sides of the base 46 are each formed with coaxially aligned inwardly extending cylindrical recesses 48 which are designed to pivotally support and receive the laterally bent ends 33 of the tubular members 32.

The operation of this device is the same as that described above.

In the fragmentary side elevational view of Figure 6, the attachment constructed in accordance with this invention is shown as applied to a grease gun fitting which is bent at an angle of substantially 45°.

As is seen in this figure the attachment includes a pair of elongated, spaced and substantially parallel tubular members 52 having one of their respective adjacent ends 53 bent laterally at an angle of approximately 90° with respect to the longitudinal axis of their respective tubular members. The ends 53 are disposed in confronting, spaced apart relationship and are coaxially aligned.

Means are provided for supporting the cylindrical cap 56 in the manner described above in connection with the first two embodiments of this invention, and it will be noticed that the open end of the cap 56 is adapted to be disposed in and secured to a circumferential groove 57 formed in a rubber seal ring 58 which is adapted to make sliding and sealing engagement with the angularly off-set cylindrical portion 51' of the grease gun fitting 51.

While the rubber seal ring 58 is shown as engaging against the opposed ends 53 of the tubular members 52, it will be understood that the movement of the cap 56 relative to the ends 53 is limited by the length of the arms 54 of the inverted substantially U-shaped tubular element.

As in the previous embodiments, resilient means, under tension, are connected between the arms 54 and pins 55 whereby the U-shaped element is constantly biased for movement toward the ends 53 of the tubular members 52.

In Figure 7, the attachment constructed in accordance with this invention is shown as being applied to a right angle grease gun fitting 61 having a cylindrical outer end portion 61'.

As in the previous cases, the attachment 60 comprises a pair of elongated, spaced and substantially parallel tubular members 62 having one of their respective ends 63 bent laterally at an angle of approximately 90° with respect to the longitudinal axis of their respective tubular members. The ends 63 are disposed in confronting, spaced apart relationship and are coaxially aligned.

An inverted, substantially U-shaped tubular element is provided, as before, and includes a pair of substantially parallel arms 64 having one of their respective ends telescoped within the other ends of the tubular members 62.

A pin 65 extends transversely across the lower end of each of the tubular members 62 and has anchored thereto one end of a helicoidal spring (not shown), under tension, whose other end is connected as described above with the telescoped ends of the arms 64 to constantly bias the U-shaped element for relative movement toward the ends 63.

A substantially hollow cylindrical cap is supported on the inverted U-shaped element in the manner described supra, the lower end of the cap 66 being received within a circumferential groove 67 formed in a sealing ring 68 which is in sliding and sealing contact with the exterior surface of the extension 61' of the fitting 61.

The operation of this application of the invention is identical to that of the previous embodiments.

Having described and illustrated a plurality of embodiments of this invention, it is to be understood that the same are offered by way of example, and that the invention is to be limited only by the scope of the following claims.

What is claimed is:

1. A moisture, dirt and dust proof cap for a grease gun fitting comprising a pair of elongated tubular members each having one of their respective ends adapted for pivotal connection with opposite sides of said fitting, an inverted substantially U-shaped tubular member having the arms thereof telescopingly mounted within one end of said elongated tubular members, an elongated substantially cylindrical cap having opposed open and closed ends, means connecting said closed end of said cap for rotation on the base of said U-shaped tubular member, and a tension spring disposed wholly within each of said tubular members and connected between said tubular members and their respective adjacent arms of said U-shaped member, said spring constantly tending to urge said U-shaped member towards said tubular members.

2. A moisture, dirt and dust proof cap for a grease gun fitting comprising a pair of elongated tubular members each having an end portion thereof bent laterally at substantially right angles to the longitudinal axis of said members, said end portions of said tubular members being adapted for pivotal connection with opposite sides of said fitting, an inverted substantially U-shaped member having the arms thereof telescoped within the other ends of said tubular members, a helicoidal spring disposed within each of said tubular members and connected with each of said tubular members and the adjacent ends of said tubular arms whereby said U-shaped member is constantly biased for relative movement toward said one end of said tubular members, an elongated collar mounted for rotation on the base of said U-shaped member, an elongated substantially cylindrical cap having opposed open and closed ends, said cap being positioned between said tubular members and their respective adjacent tubular arms, said closed end of said cylindrical cap having a depressed portion extending diametrically thereacross and adapted to receive said sleeve therein, means securing said sleeve to said closed end of said cylindrical cap, and a substantially flexible sealing ring fixed to the open end of said cylindrical cap.

3. A moisture, dirt and dust proof cap for a grease gun fitting having a lateral extension adjacent one end thereof comprising a pair of elongated tubular members each having an end portion thereof bent laterally at substantially right angles to the longitudinal axis of said members, said grease gun fitting having a pair of oppositely disposed recesses formed therein and adapted to receive for rotation said end portions of said tubular members, an inverted substantially U-shaped member having the arms thereof telescoped within the other ends of said tubular members, a helicoidal spring disposed within each of said tubular members and connected with each of said tubular members and the adjacent ends of said tubular arms whereby said U-shaped member is constantly biased for relative movement toward said one end of said tubular members, an elongated collar mounted for rotation on the base of said U-shaped member, an elongated substantially cylindrical cap having opposed open and closed ends, said cap being positioned between said tubular members and their respective adjacent tubular arms, said closed end of said cylindrical cap having a substantially semi-circular depressed portion extending diametrically thereacross and adapted to receive said sleeve therein, means securing said sleeve to said opposed end of said cylindrical cap, and a substantially flexible sealing ring affixed to the open end of said cylindrical cap and adapted to engage and seal against said lateral portion of said grease gun fitting.

4. A moisture, dirt and dust proof cap for a substantially cylindrical grease gun fitting having an enlarged laterally extending base, said grease gun fitting comprising a pair of elongated tubular members each having an end portion thereof bent laterally at substantially right angles to the longitudinal axis of said members, said base having a pair of oppositely disposed recesses formed therein to pivotally receive said end portions of said tubular members, an inverted substantially U-shaped member having the arms thereof telescoped within the other ends of said tubular members, a helicoidal spring disposed within each of said tubular members and connected with each of said tubular members and the adjacent ends of said tubular arms whereby said U-shaped member is constantly biased for relative movement toward said one end of said tubular members, an elongated collar mounted for rotation on the base of said U-shaped member, an elongated substantially cylindrical cap having opposed open and closed ends, said cap being positioned between said tubular members and their respective adjacent tubular arms, said closed end of said cylindrical cap having a substantially semicircular depressed portion extending diametrically thereacross and adapted to receive said sleeve therein, means securing said sleeve to said opposed end of said cylindrical cap, said sealing ring engaging against said cylindrical surface and said laterally off-set portion of said fitting.

References Cited in the file of this patent

UNITED STATES PATENTS

| 759,185 | Miller | May 3, 1904 |
| 1,440,318 | Soto | Dec. 26, 1922 |
| 1,596,616 | Marsh et al. | Aug. 17, 1926 |
| 2,379,529 | Kennedy | July 3, 1945 |

FOREIGN PATENTS

| 816,822 | France | May 10, 1937 |
| 588,196 | Great Britain | May 16, 1947 |